US008122254B2

(12) United States Patent
Uzawa

(10) Patent No.: US 8,122,254 B2
(45) Date of Patent: Feb. 21, 2012

(54) INFORMATION PROCESSING APPARATUS AND METHOD THEREOF

(75) Inventor: Mitsuru Uzawa, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 1034 days.

(21) Appl. No.: 11/391,657

(22) Filed: Mar. 28, 2006

(65) Prior Publication Data

US 2006/0236113 A1 Oct. 19, 2006

(30) Foreign Application Priority Data

Mar. 31, 2005 (JP) ................................ 2005-104362

(51) Int. Cl.
*H04L 9/00* (2006.01)

(52) U.S. Cl. ......... 713/176; 713/100; 713/168; 713/170

(58) Field of Classification Search .................. 380/200, 380/30; 713/192, 168, 182; 726/4, 13, 30, 726/24; 709/12, 14
See application file for complete search history.

(56) References Cited

U.S. PATENT DOCUMENTS

| | | | | |
|---|---|---|---|---|
| 6,239,818 | B1 * | 5/2001 | Yoda | 347/43 |
| 2001/0018744 | A1 * | 8/2001 | Yoshihiro | 713/200 |
| 2003/0105950 | A1 * | 6/2003 | Hirano et al. | 713/100 |
| 2005/0021980 | A1 * | 1/2005 | Kanai | 713/182 |
| 2005/0132195 | A1 * | 6/2005 | Dietl | 713/176 |
| 2008/0285789 | A1 * | 11/2008 | Kimura et al. | 382/100 |

FOREIGN PATENT DOCUMENTS

| | | |
|---|---|---|
| JP | 11-258985 A | 9/1999 |
| JP | 2004-058410 | 2/2004 |
| JP | 2005-236860 A | 9/2005 |

OTHER PUBLICATIONS

Nov. 20, 2009 Japanese Office Action that issued in Japanese Patent Application No. 2005-104362, which is enclosed without English Translation.

Feb. 22, 2010 Japanese Office Action, which is enclosed without English Translation, that issued in Japanese Patent Application No. 2005-104362.

* cited by examiner

*Primary Examiner* — Vivek Srivastava
*Assistant Examiner* — Nega Woldemariam
(74) *Attorney, Agent, or Firm* — Cowan, Liebowitz & Latman, P.C.

(57) ABSTRACT

It is simpler to manage an electronic signature on a It is simpler to manage an electronic signature on a server. On the contrary, authentication in a paper is more conveniently managed by a serverless system. However, data embedded in a document relies on an authentication system and security system. In view of this, a security data extraction unit separates electronic data into security data and non-security data. An image arrangement unit arranges the non-security data on a paper surface and converts it to readable image data. An encryption processing unit encrypts the security data. An authentication program generation unit generates an authentication program that executes authentication using authentication data. A package unit packages the encrypted data and the authentication program. A background embedding unit generates background image data where the package data is embedded in a background pattern. An output image generation unit synthesizes the background image data with the readable image data, and generates encrypted image data.

9 Claims, 10 Drawing Sheets

INFORMATION PROCESSING APPARATUS AND METHOD THEREOF

FIELD OF THE INVENTION

The present invention relates to an information processing apparatus and method thereof, and more particularly, to information processing for embedding information in a document.

BACKGROUND OF THE INVENTION

Recently, there is increasing awareness for security, such as privacy protection, blocking leaks of corporate secrets, and the like. The increasing awareness raises the necessity for a system that can protect confidential contents recorded in, e.g., a document (paper), and that enables only a particular person to access the data when transmitting data on a piece of paper. Since such system does not let a third person see data recorded in a document, it can prevent careless data leaks.

In order to decrypt data embedded in a document by the system, a Public Key Infrastructure (PKI) server that determines disclosure of the data recorded in a document, or an authentication server, and a decryption engine that deciphers encrypted data are essential.

For instance, encrypted electronic data cannot be decrypted (decoded) without key data used in the encryption. In other words, having the key data itself is the authentication processing. This is because, in electronic data encryption, electronic data itself is invariable and can always be decrypted as long as there is key data.

Meanwhile, when data is embedded in a document (paper), employed is an embedding method having as much resistance as possible using a cyclic pattern. In other words, it focuses on accurate detection, analysis, recognition and extraction of data embedded in a document.

In the meantime, it is simpler to manage an electronic signature on a server since it is electronic data supposed to be handled on a network. On the contrary, authentication in a portable physical medium such as paper is more conveniently managed by a serverless system that does not require network intermediation. For instance, Japanese Patent Application Laid-Open No. 2004-058410 discloses a serverless system for reading a document having embedded secret data, which enables a particular authenticated user to access the secret data.

However, when realizing the serverless system disclosed in Japanese Patent Application No. 2004-058410, data embedded in a document relies on the authentication system and security system. In other words, in the serverless system, the data embedded in a document cannot be disclosed in a place where the same authentication system and the same security system do not exist.

SUMMARY OF THE INVENTION

The first aspect of the present invention discloses a method of converting electronic data to image data by utilizing an information processing apparatus, the method comprising the steps of: inputting electronic data; separating the electronic data into security information and non-security information; encrypting the security information; inputting authentication data; packaging the encrypted security information and an authentication program, which includes the authentication data and a decryption program corresponding to the encryption; embedding the package data in a background pattern; converting the non-security information to readable image data; and synthesizing the background pattern with the readable image data.

The second aspect of the present invention discloses a method of extracting data embedded in a document by utilizing an information processing apparatus, the method comprising the steps of: inputting a document image; extracting first information embedded in the document image; inputting authentication data; and extracting second information included in the first information by executing an authentication program included in the first information, wherein the authentication data is as input data of the authentication program.

According to the present invention, it is possible to provide a method of embedding information in a document, where data disclosure does not rely on an authentication system, a security system and the like.

The third aspect of the present invention further discloses selecting a method of the embedding based on an arrangement of the readable image data and a characteristic of the package data.

According to the present invention, it is possible to embed as many information as possible while maintaining resistance of information embedded in a document.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Hereinafter, information processing according to embodiments of the present invention is described in detail with reference to the accompanying drawings.

First Embodiment

Figure 1:
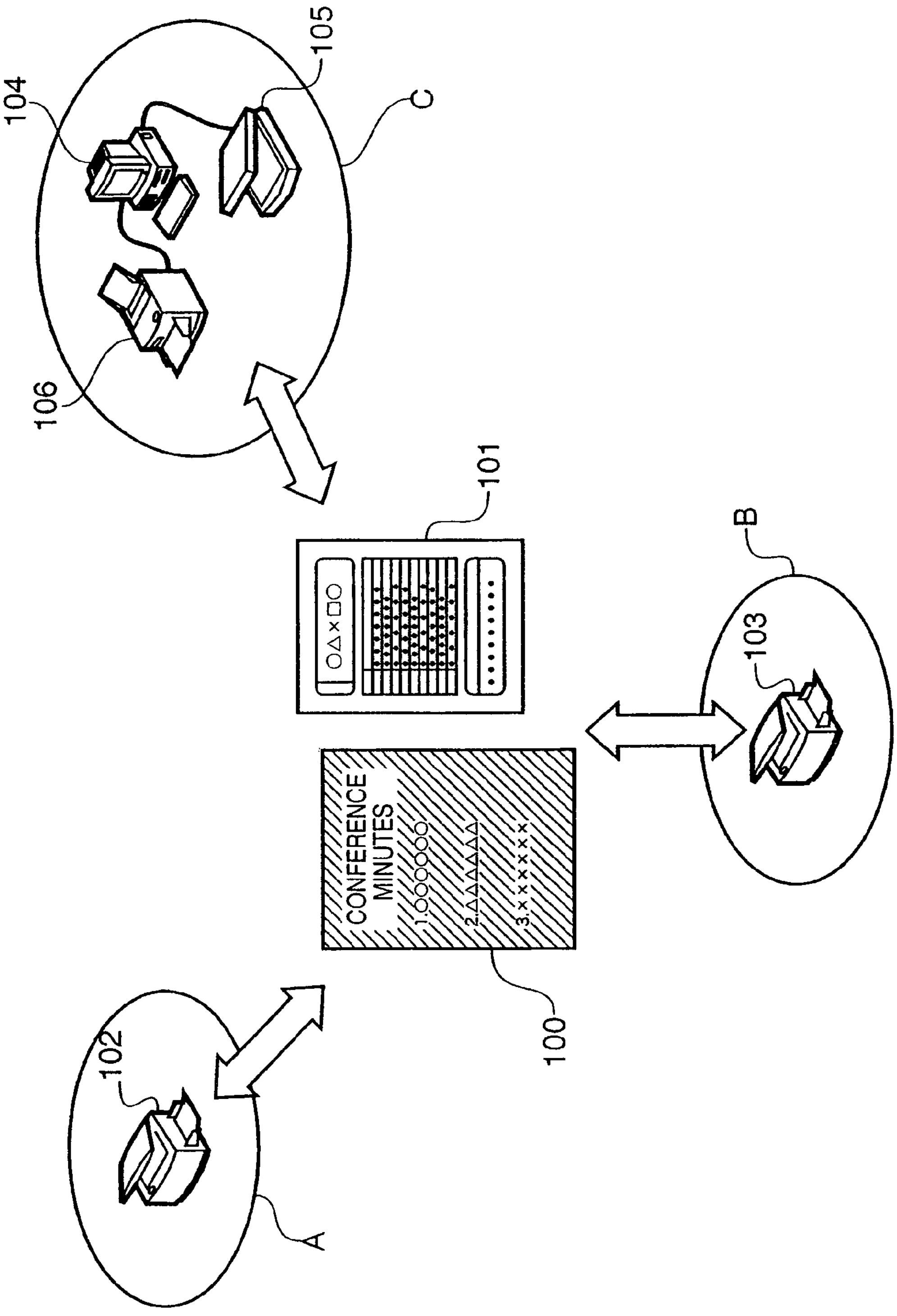
FIG. 1 is a conceptual view showing an overview of the system according to an embodiment of the present invention.

FIG. 1 is a conceptual view showing an overview of the system according to an embodiment of the present invention.

In FIG. 1, the domain A includes a multi-functional peripheral equipment (MFP) 102, the domain B includes an MFP 103, and the domain C includes a client PC 104, a scanner 105, and a printer 106. Note that the MFPs 102 and 103 as well as the client PC 104 execute the processing that will be described later. Each of these domains has different network environments due to respective sections such as offices, and cannot perform communication through a network.

Documents 100 and 101 subjected to processing in the present embodiment concern personal information or corporate secrets, such as a bank account application form, an insurance contract and so on. On the surface of the documents 100 and 101, only the contents that may be disclosed from the aspect of security are visibly shown, and information concerning privacy or secret information are, for instance, encrypted and embedded in an image on the paper surface as a digital watermark pattern. Note, hereinafter information concerning privacy, secret information and the like are comprehensively referred to as "security data."

For instance, in the domain A, the documents 100 and 101 where secret data is embedded are generated by the MFP 102. The documents 100 and 101 are transmitted to the domain B (or C), where data in the documents 100 and 101 is disclosed by the MFP 103. Alternatively, in the domain C, the data in the documents 100 and 101 is disclosed by the client PC 104.

Figure 2A:
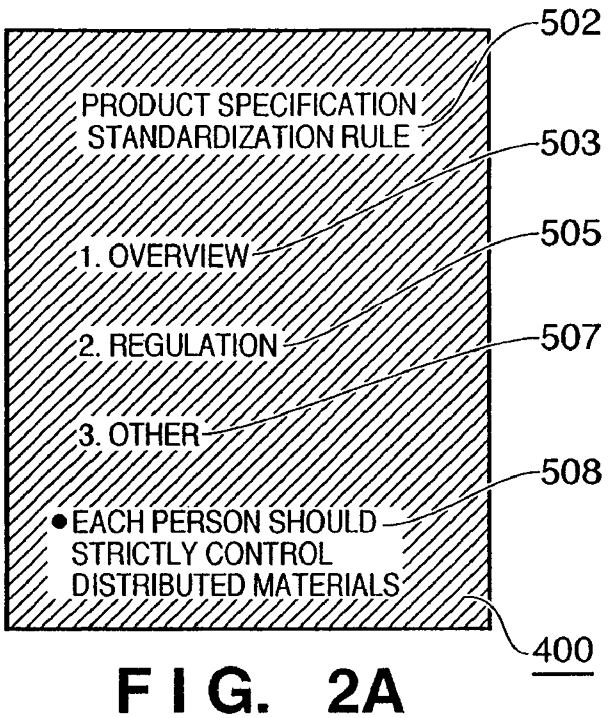
FIGS. 2A and 2B are explanatory views describing details of a document subjected to processing according to the embodiment.
Figure 2B:
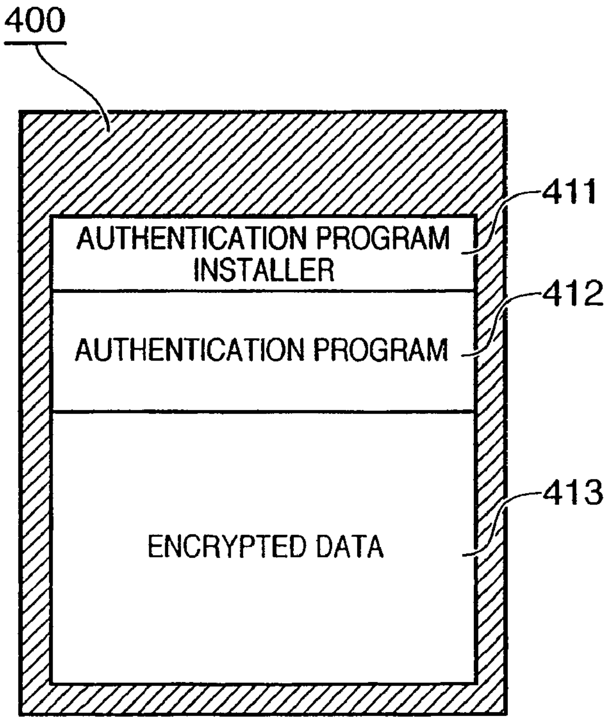

FIGS. 2A and 2B are explanatory views describing details of a document 400 subjected to processing according to the present embodiment.

The document 400 includes data 502 to 508 which are shown on the paper surface in FIG. 2A, and data 411 to 413 which are embedded as data that cannot be analyzed by a person, such as a digital watermark as in FIG. 2B. The embedded data includes an authentication program installer 411, an authentication program 412, and encrypted data 413. Note that key data and a decryption program necessary for deciphering the encrypted data 413 are included in the authentication program 412. Therefore, for instance, in the documents 100 and 101 generated by the MFP 102, the authentication program installer 411, the authentication program 412, and the encrypted data 413 are embedded as a digital watermark according to the similar rule to that of the document 400. Then in the MFP 103, when the documents 100 and 101 are approved by the authentication program 412 embedded in the documents 100 and 101, the encrypted data 413 can be deciphered and disclosed.

The above description provides a brief overview of the system according to the present embodiment. Hereinafter, a concrete method of realizing the system is described.

[Construction of Apparatus]

Figure 3:
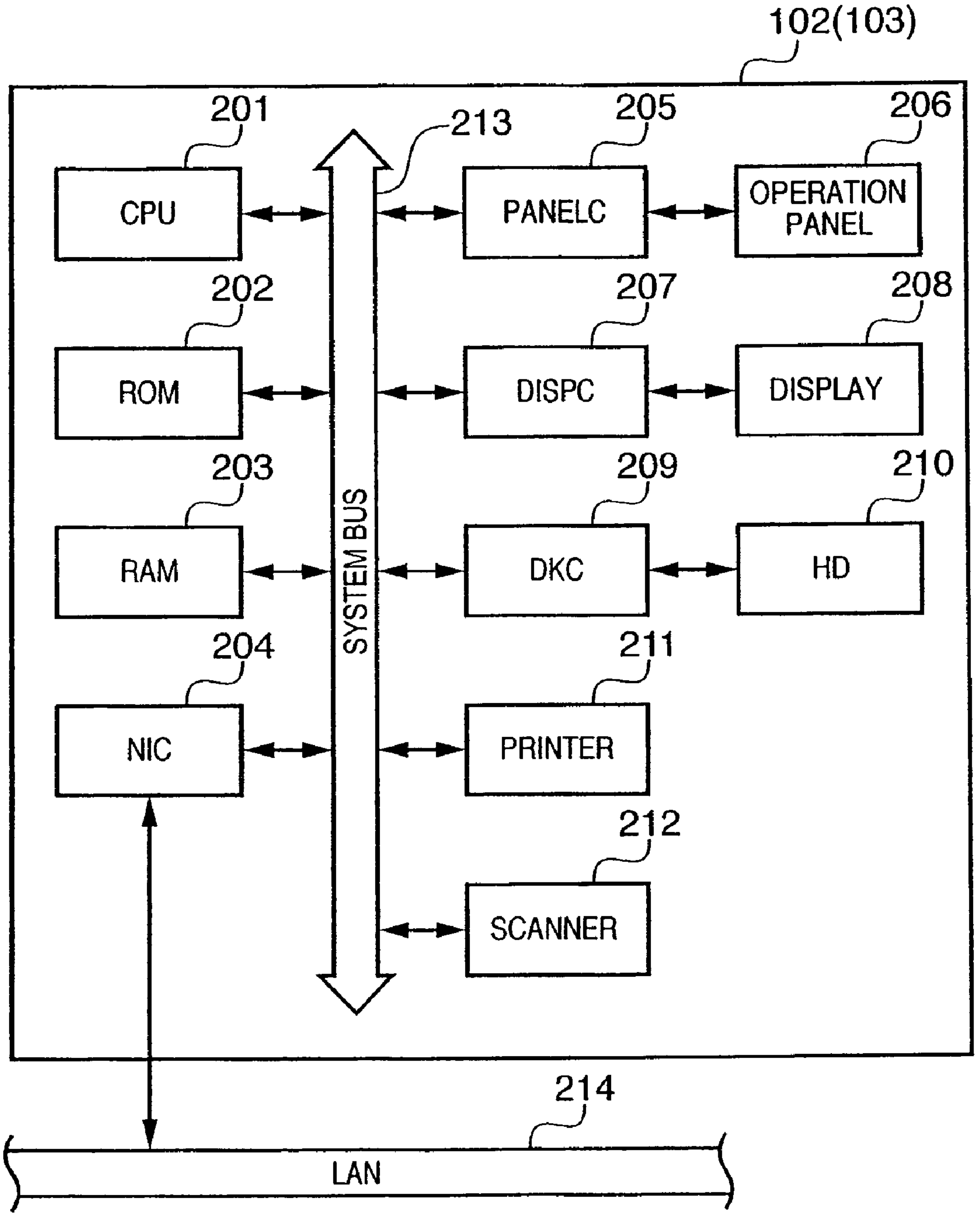
FIG. 3 is a block diagram showing a construction of a multi-functional peripheral equipment (MFP)

FIG. 3 is a block diagram showing a construction of the MFP 102 or 103. Note that the client PC 104 has substantially a similar construction by being connected with the scanner 105 and the printer 106.

The MFP 102 (or 103) comprises a CPU 201 for executing software stored in ROM 202 or a large-capacity storage device (HD) 210 such as a hard disk. The CPU 201 comprehensively controls respective units connected to a system bus 213, which will be described later, using RAM 203 as a work memory. The HD 210 is controlled via a disk controller (DKC) 209 and employed as a temporary storage of various data and image data which will be described later.

An external input controller (PANELC) 205 inputs user's instructions from an MFP's operation panel 206 which includes various buttons or a touch panel. A display controller (DISPC) 207 controls display operation of a display unit 208 configured with, e.g., a liquid crystal display.

A network interface card (NIC) 204 bidirectionally transmits or receives data to other network devices in the same domain or a server through a local area network (LAN) 214.

A printer 211 prints an image on printing paper by a printing method such as an electrophotographic method or an inkjet method. A scanner 212 reads an original image. In many cases, an auto document feeder (ADF) which is not shown in the drawing is attached to the scanner 212 as an option for consecutive image reading of plural pages of original documents.

[Overview of Processing]

Described next is a method of generating a document (image) having embedded data shown in FIG. 2 by the above-described MFP.

Figure 4:
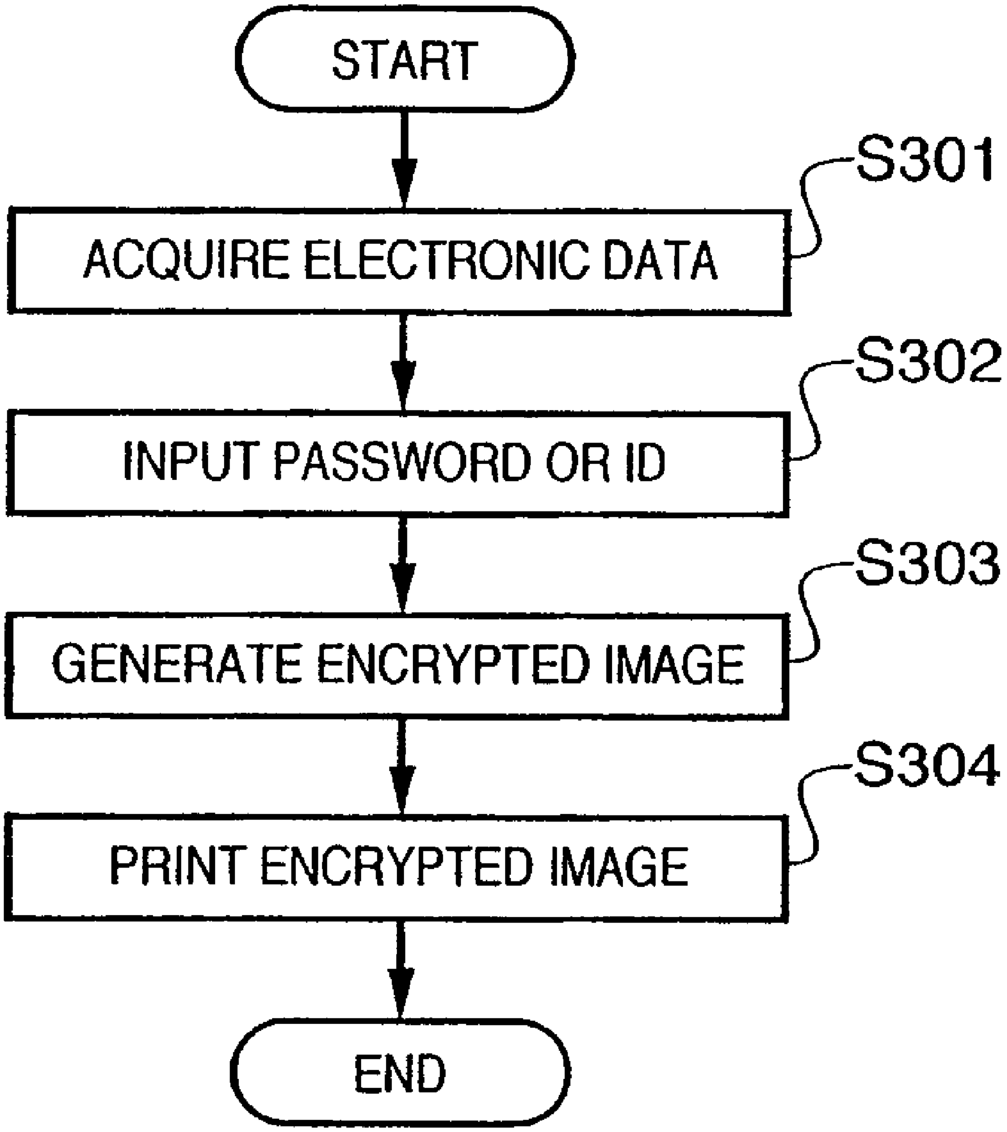
FIG. 4 is a flowchart describing generation processing of a document having encrypted security data embedded therein based on electronic data including security data.

FIG. 4 is a flowchart describing generation processing of a document having encrypted security data embedded therein based on electronic data including security data. This processing is executed by the aforementioned software and the CPU 201.

The user operates the operation panel 206 while referring to data displayed on the display unit 208, and instructs acquisition of electronic data subjected to documenting (stored in a predetermined storage area of the HD 210 or another database (not shown) connected to the LAN 214). The CPU 201 acquires the designated electronic data and stores it in the RAM 203 (S301).

Figure 5:
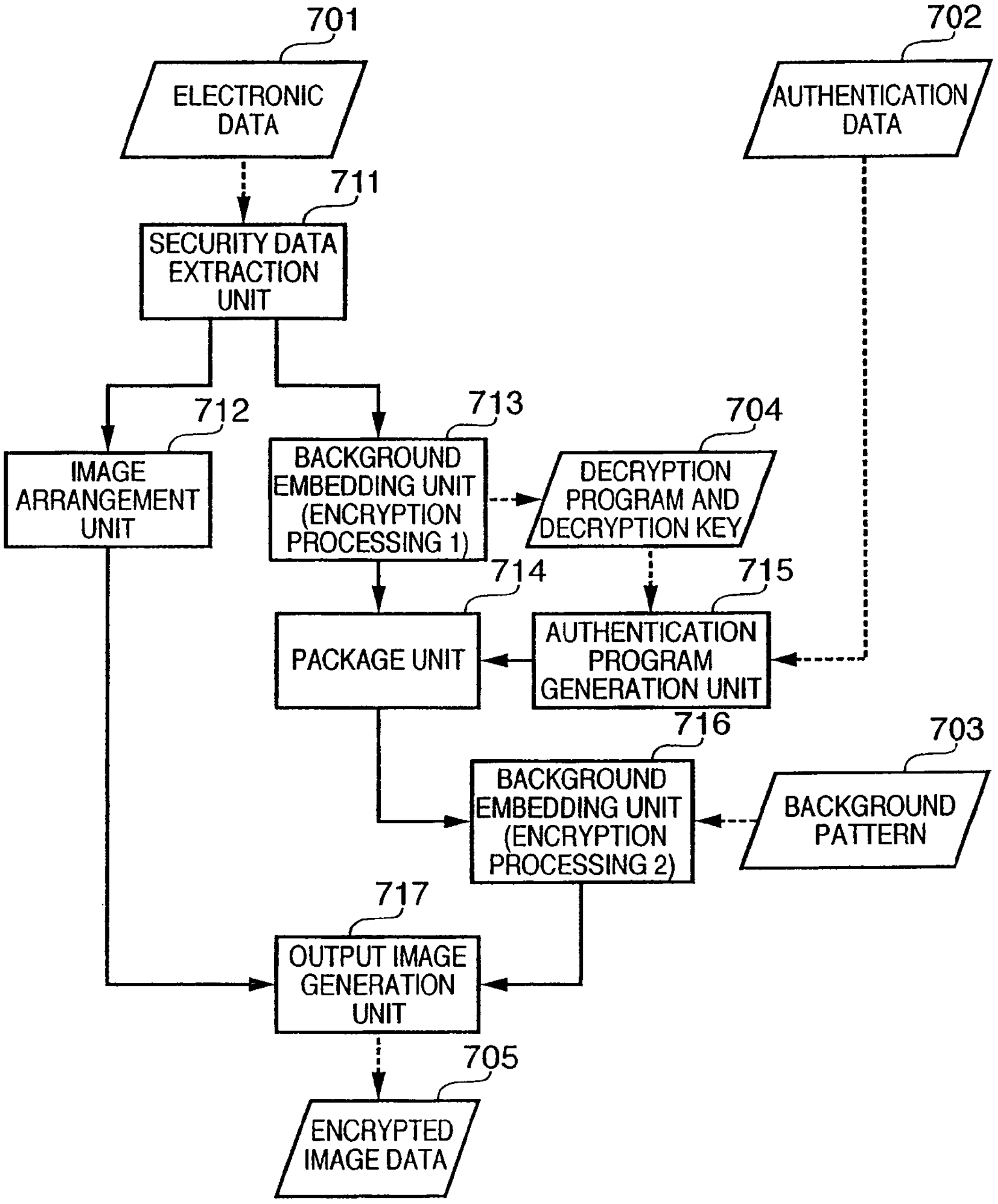
FIG. 5 is a flowchart describing electronic data encryption processing.

Next, the user operates the operation panel 206 to instruct encryption and output of the acquired electronic data, and sets a password or an ID for deciphering the encryption (hereinafter referred to as authentication data). The CPU 201 instructs encryption and output, and inputs the authentication data (S302). Then, an encryption and output program is loaded from the ROM 202 to the RAM 203 for processing the acquired electronic data, and an image (hereinafter referred to as an encrypted image) having embedded security data as encrypted data 413 shown in FIG. 2, which will be described later in FIG. 5, is generated (S303). The CPU 201 then prints the generated encrypted image on printing paper to generate a document (S304).

In the foregoing manner, the documents 100 and 101 where electronic security data is encrypted and embedded are generated. The user transmits these documents 100 and 101 to another domain in an arbitrary method.

[Encryption of Electronic Data]

FIG. 5 is a flowchart describing electronic data encryption processing. A security data extraction unit 711, an image arrangement unit 712, an encryption unit 713, an authentication program generation unit 715, a package unit 714, a background embedding unit 716, and an output image generation unit 717 in FIG. 5 are encryption and output program modules which are loaded in the RAM 203 and executed.

The security data extraction unit 711 inputs electronic data 701 acquired in step S301 and separates the electronic data 701 into security data and non-security data. The security data is outputted to the encryption unit 713 and the non-security data is outputted to the image arrangement unit 712.

Figure 6:
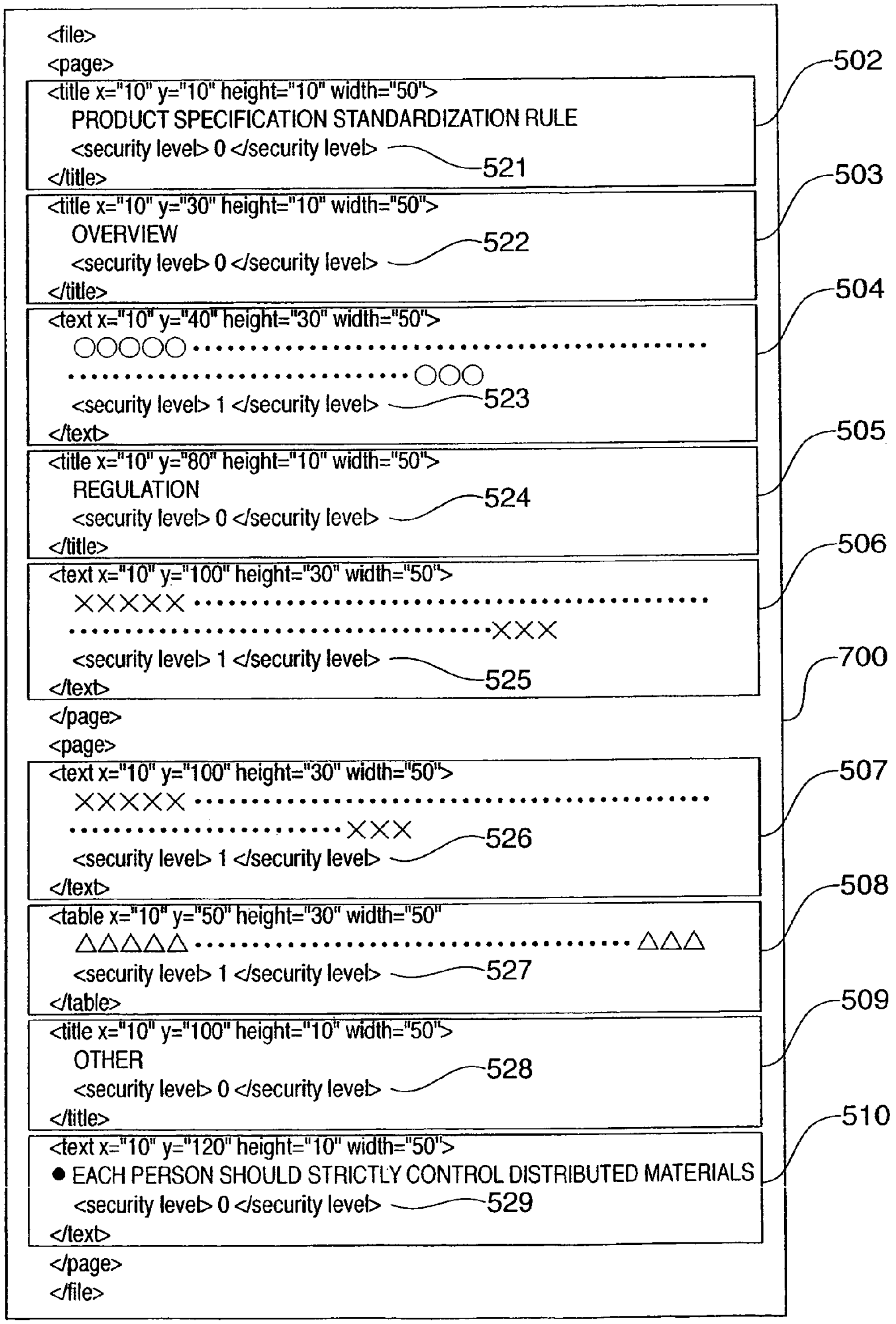
FIG. 6 is a view showing an example of electronic data.
Figure 7:
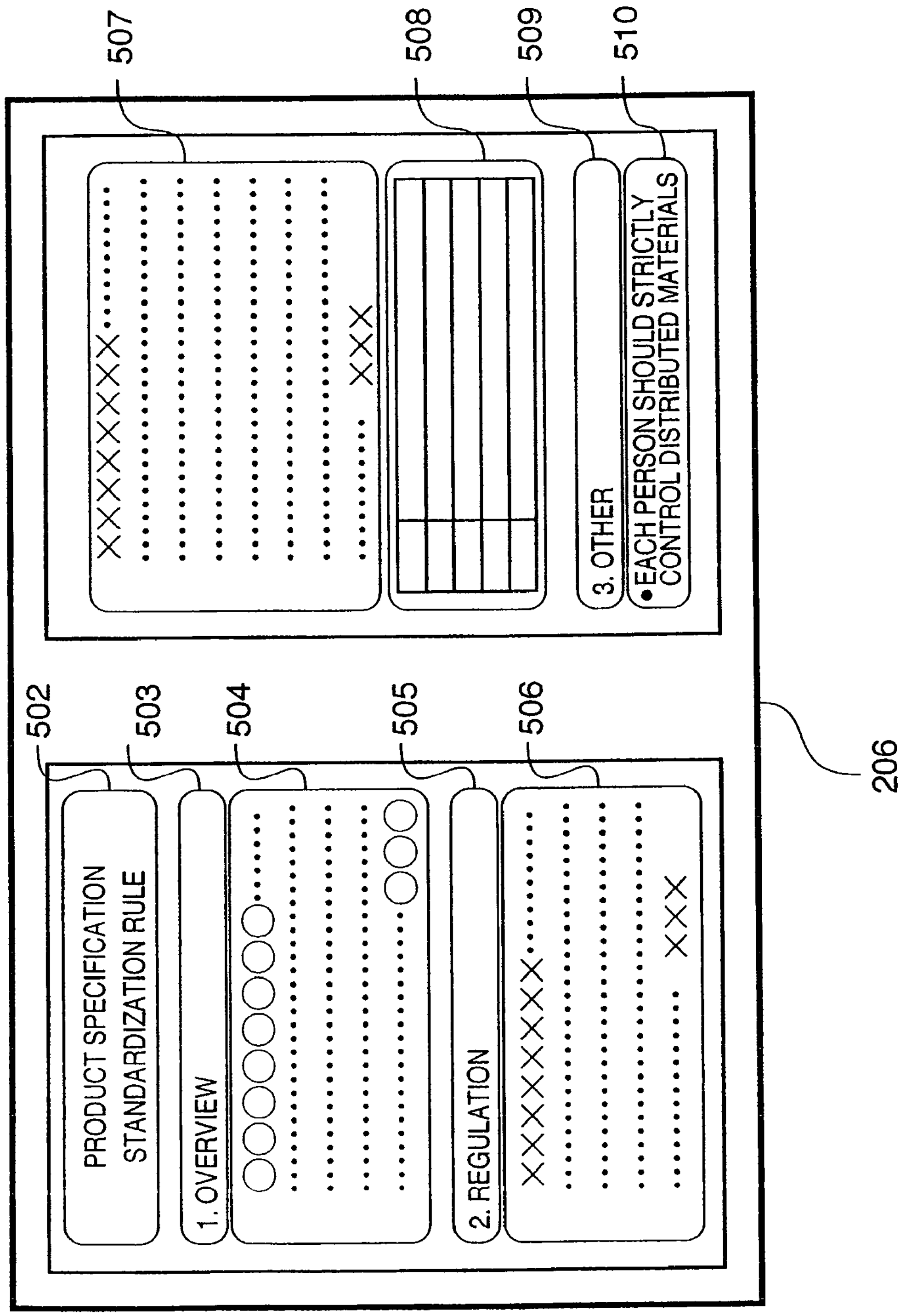
FIG. 7 is a view showing a display example in a case where electronic data is displayed on a display unit.

FIG. 6 shows an example of the electronic data 701. In the example shown in FIG. 6, the electronic data 701, expressed in XML (Extensible Markup Language), is configured with plural data blocks 502 to 510 that represent the document. Note that if the electronic data 701 is displayed on the display unit 208 without encrypting the security data, the data blocks 502 to 510 would be displayed as shown in FIG. 7.

In each of the data blocks 502 to 510, the security level of each block is set as meta data 521 to 529. The security data extraction unit 711 determines security levels of respective data blocks 502 to 510 based on the meta data 521 to 529, and separates the data blocks into security data and non-security data. Note, the following description provides an example in which the security level expressed by meta data "security level" having "1" or higher is treated as security data. However, the security levels which discriminate security data from non-security data can arbitrarily be set.

Figure 8B:
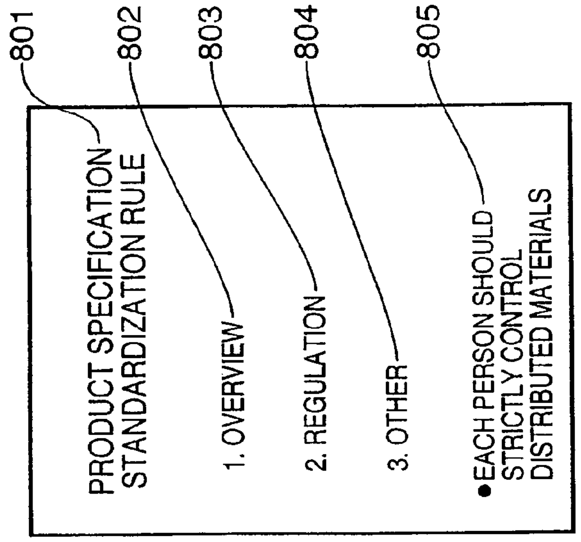
FIGS. 8A and 8B are views showing an example of converting non-security data to readable image data.
Figure 8A:
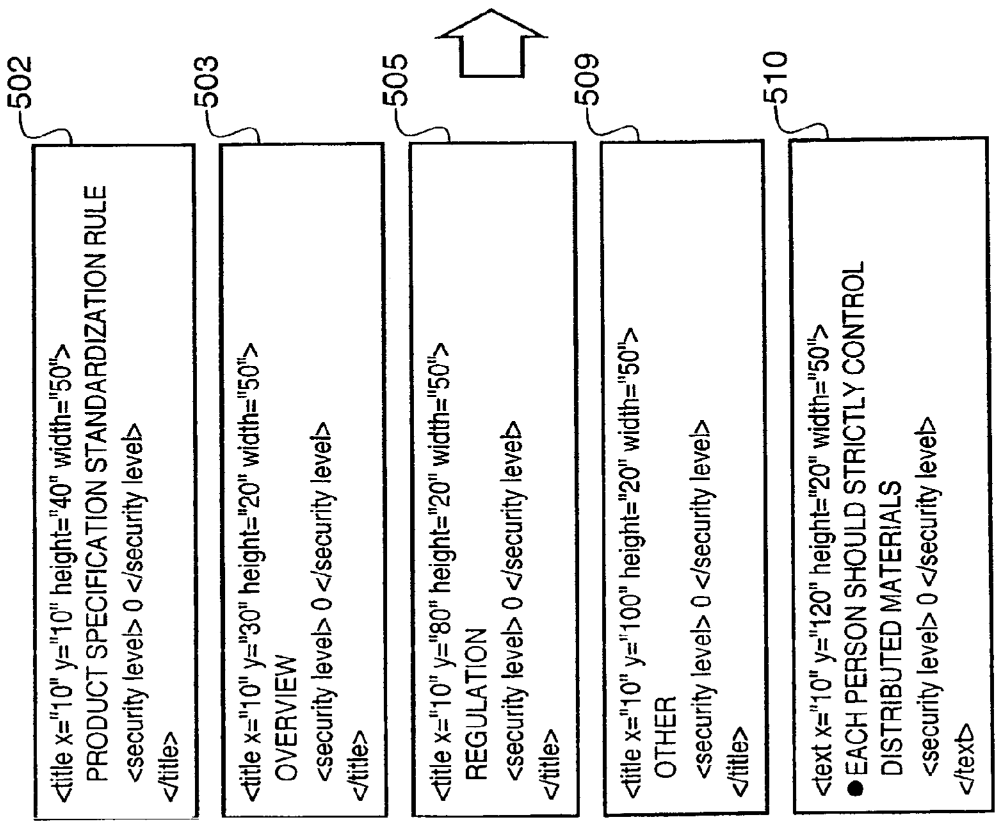

The image arrangement unit 712 converts inputted non-security data to image data (hereinafter referred to as "readable image data") to be respectively arranged on the rectangular regions of the paper surface. FIGS. 8A and 8B show an example of converting non-security data to readable image data. The non-security data 502, 503, 505, 509, and 510 shown in FIG. 8A are extracted by the security data extraction unit 711, and are subjected to image size adjustment or the like by the image arrangement unit 712. Thereafter, the image data is arranged so as not to overlap with each other on the paper surface, as shown in FIG. 8B.

Meanwhile, the encryption processing unit 713 encrypts the inputted security data using key data, which is for instance generated in advance from random numbers. The encryption is to convert texts, symbols, and bit strings to different texts, symbols, and bit strings using a parameter called a key in accordance with a predetermined procedure. Encrypted data cannot be decrypted unless one knows the key used in encryption. Note that an encryption algorithm employed by the encryption processing unit 713 may be of a symmetric algorithm where the encryption key and decryption key are the same, or an asymmetric algorithm where the encryption key and decryption key are different, thus may be selected from various algorithms. Herein, the embodiment adopts a well-known method determined to be the safest from the aspect of security. Note that a user may select an encryption algorithm to be used from the aforementioned two algorithms.

The encryption processing unit 713 outputs the encrypted data to the package unit 714, and outputs a decryption key 704 and a decryption program corresponding to the encryption to the authentication program generation unit 715.

The authentication program generation unit 715 inputs the decryption program and decryption key 704 as well as the authentication data 702 inputted by the user in step S302. Then, an authentication program that executes authentication using the authentication data 702 is generated, and further the authentication program including the decryption program using the decryption key is outputted to the package unit 714. The authentication program enables execution of the decryption program using the decryption key, when authentication using the authentication data succeeds.

The package unit 714 packages the inputted encrypted data, the authentication program, and the authentication program installer (and uninstaller), then outputs the package data to the background embedding unit 716.

The background embedding unit 716 inputs the package data and a background pattern 703, and generates background image data where the package data is embedded in the background pattern 703 by a high-resistance method, such as a cyclic digital watermark technique. Then, the background image data is outputted to the output image generation unit 717. In the case of embedding the package data in a background pattern as a digital watermark, the readable image data generated by the image arrangement unit 712 is acquired and the digital watermark is embedded so as not to overlap with the non-security data. As a result, a larger amount of data can be embedded with high resistance. Furthermore, the background pattern 703 may be selected from plural background patterns, or may be selected by a user.

The output image generation unit 717 synthesizes the inputted background image data with the readable image data and generates the encrypted image data 705.

The above-described processing generates, from inputted electronic data, encrypted image data 705 of the documents 100 and 101, in which the readable image data is superimposed on the background pattern having embedded security data.

[Decryption of Encrypted Image]

Next, a method of decrypting and disclosing the security data embedded in the documents 100 and 101 is described.

Figure 9:
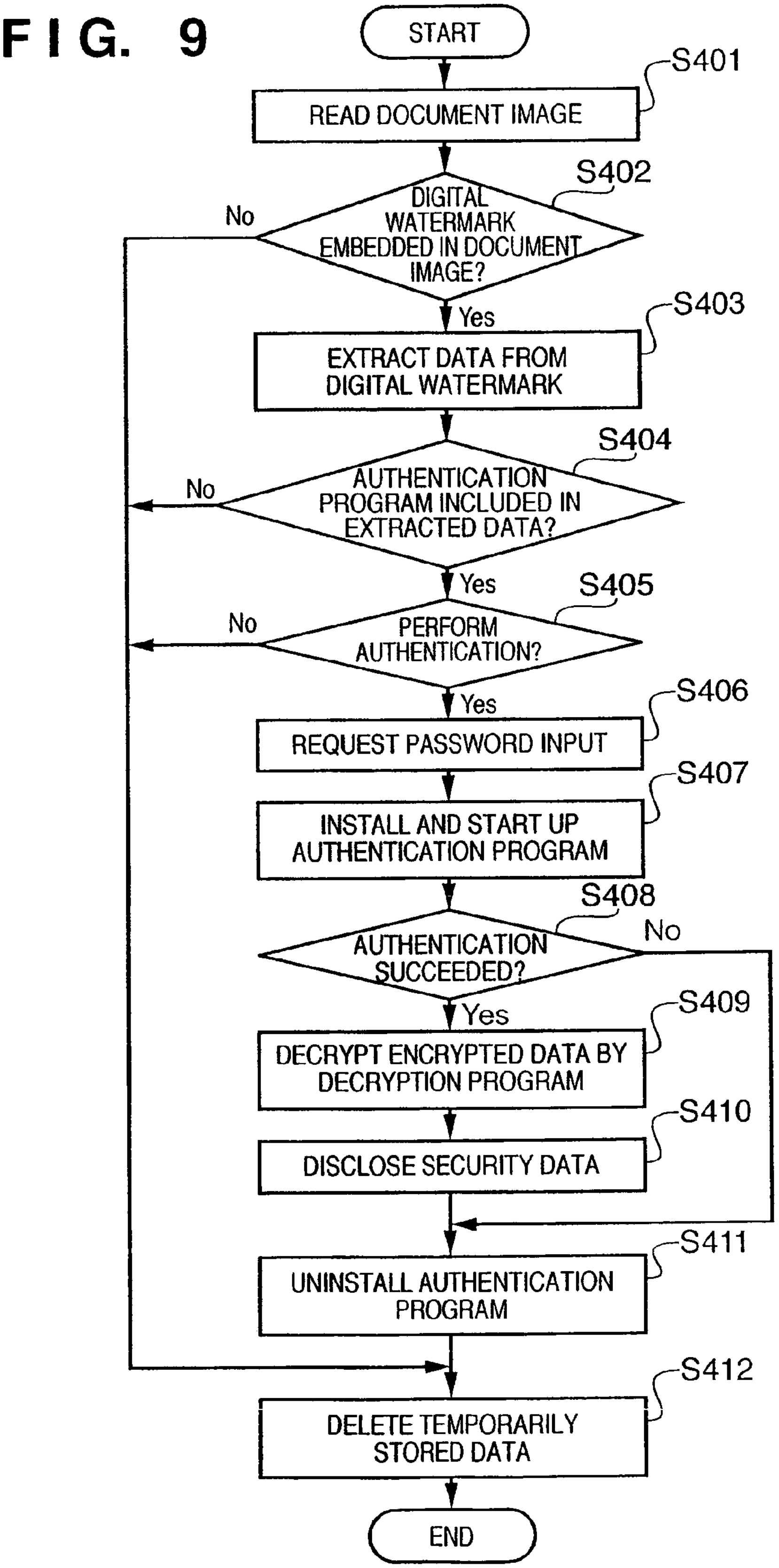
FIG. 9 is a flowchart describing the processing for decrypting and disclosing security data embedded in a background pattern as a digital watermark.

FIG. 9 is a flowchart describing the processing for decrypting and disclosing security data embedded in a background pattern as a digital watermark. This processing is executed by the CPU 201 of the MFP which performs decryption processing.

A user of the domain receiving the document 100 (or 101) places the document (or 101) on the reading unit of the scanner 212 of the MFP that serves as a domain of the user, and operates the operation panel 205 of the MFP to instruct disclosure of the data embedded in the document. The CPU 201 causes the scanner 212 to read the document image, and converts the image signals outputted by the scanner 212 to, e.g., image data having 600 dpi (S401).

Next, the CPU 201 loads the decryption program from the ROM 202 (or HD 210) to the RAM 203 and executes a digital watermark extraction program using, as input data, the image data read from the document. The extraction program analyzes the image data to determine whether or not a digital watermark is embedded in the document image (S402). Note that plural extraction programs may be provided. In a case where plural extraction programs are executed, then thereafter an extraction program capable of detecting a digital watermark embedded in a document image read by the scanner 212 is functioned.

If a digital watermark is not detected in the document image, the CPU 201 advances the control to step S412 to notify the user that decryption of the data embedded in the document cannot be performed or data is not embedded in the document by displaying a message on the display unit 208 of the MFP. Meanwhile, if a digital watermark is detected in the document image, the digital watermark is extracted by the extraction program for interpretation, and the data embedded in the document is extracted and temporarily stored in the RAM 203 (or HD 210) (S403).

Next, the CPU 201 determines whether or not an authentication program is included in the data stored in the RAM 203 (S404). If an authentication program is not included, the CPU 201 advances the control to step S412, and notifies the user by displaying a message on the display unit 208 that authentication for disclosing the data embedded in the document cannot be performed. Meanwhile, if an authentication program is included, a message inquiring whether or not to perform authentication is displayed on the display unit 208 in order to have the user decide whether or not to execute the authentication program (S405).

When the user designates execution of authentication by operating the operation panel 206, the CPU 201 displays an input request of authentication data (password or ID) on the display unit 208 (S406). When the user inputs authentication data by operating the operation panel 206, the CPU 201 installs the authentication program by activating (using) the authentication installer, and starts up the authentication program using the inputted authentication data as input data (S407). Note, in a case where authentication is cancelled, the CPU 201 ends the control.

The authentication program determines whether or not the inputted data matches the retained authentication data (S408). If they match (authentication succeeded), the retained decryption program is started to decrypt the encrypted portion (encrypted data 413 in FIG. 2B) of the data stored in the RAM 203 (S409). Meanwhile, if authentication fails, the CPU 201 advances the control to step S411.

The decrypted data is temporarily stored in the RAM 203. When decryption ends, the CPU 201 prints the data temporarily stored in the RAM 203 by the printer 211 (or displays it on the display unit 208) to disclose the security data to the user (S410). Note that the disclosure is realized by printing, by the printer 211, an image in which a visualized image of the security data is synthesized with (superimposed on) an image corresponding to readable image data.

After the security data is disclosed or when authentication fails, the CPU 201 uninstalls the authentication program (S411), deletes the data temporarily stored in the RAM 203 or HD 210 (S412), and ends the control.

As described above, since an authentication program is embedded in a document together with encrypted data, it is possible to disclose security data even between systems having different authentication systems. Furthermore, by embedding a digital watermark so as not to overlap with non-security data, a larger amount of data can be embedded with high resistance.

Second Embodiment

Hereinafter, the second embodiment of the present invention is described. Note in the second embodiment, with respect to the construction similar to that of the first embodiment, the same reference numerals are assigned and detailed description thereof is omitted.

The background embedding unit 716 of the first embodiment (see FIG. 5) embeds the data packaged by the package unit 714 in a cyclic noise pattern as a digital watermark. For a method of embedding data in a document, a large number of researches and developments have been conducted on the method that takes advantage of characteristics of readable data on a document (non-security data in this embodiment). For instance, there are a method of embedding data by manipulating the space between texts in a document, a method of performing collinear approximation on a graphic, if there is a graphic in a document, and embedding data with the approximate accuracy, and the like.

Figure 10:
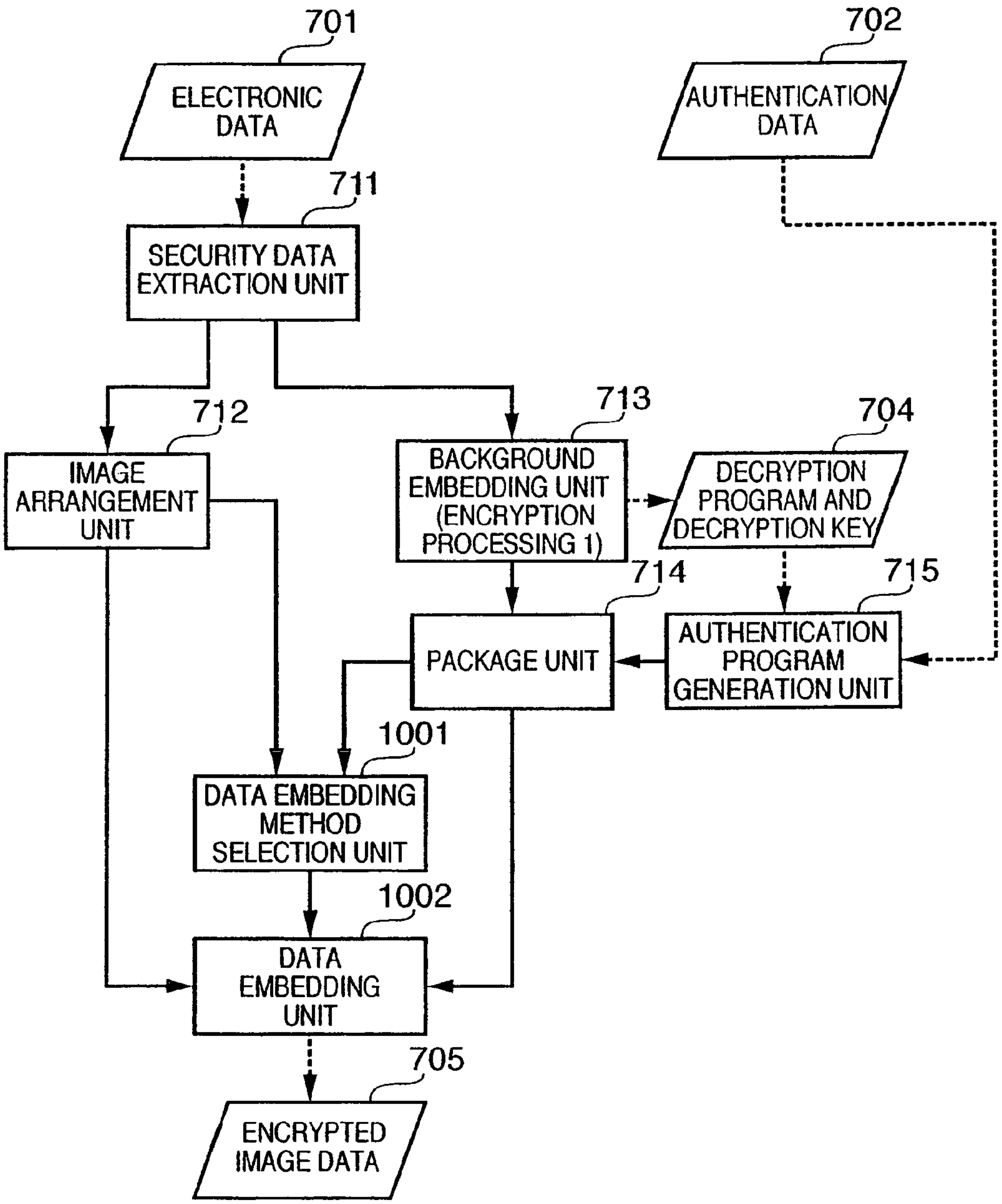
FIG. 10 is a flowchart describing electronic data encryption processing according to the second embodiment.

FIG. 10 is a flowchart describing electronic data encryption processing according to the second embodiment. Note that a data embedding method selection unit 1001 and a data embedding unit 1002 in FIG. 10 are program modules for encryption and output, which are loaded to the RAM 203 and executed.

The data embedding method selection unit 1001 space of the paper surface while maintaining resistance. To realize this, a data embedding method is selected based on the arrangement of readable image data generated by the image arrangement unit 712 and a characteristic of the package data generated by the package unit 714. The data embedding unit 1002 embeds the package data outputted by the package unit 714 in the readable image data outputted by the image arrangement unit 712 using the selected embedding method, and outputs encrypted image data 705.

According to the above-described configuration, for instance, in a case where the package data is characterized by a writing having a large amount of texts, the selection unit selects the method of embedding data utilizing the space between texts, and the embedding unit generates a document where package data is embedded in the space between texts. In a case where the package data is characterized by a small amount of data, it is possible to embed the package data with resistance using a two-dimensional code. Note that the present embodiment performs authentication using an authentication program embedded in the document. Therefore, by providing a data disclosing system with an extraction program for extracting and analyzing data embedded in a document, it is possible to realize a system capable of disclosing security data only to a particular domain.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

The present invention is not limited to the above embodiment and various changes and modifications can be made within the spirit and scope of the present invention. Therefore, to apprise the public of the scope of the present invention, the following claims are made.

This application claims the benefit of Japanese Application No. 2005-104362, filed Mar. 31, 2005, which is hereby incorporated by reference herein in its entirety.

What is claimed is:

1. A method of converting electronic data to image data by utilizing an information processing apparatus, the method comprising the steps of:

inputting electronic data;

separating the electronic data into security information and non-security information;

encrypting the security information;

inputting authentication data;

packaging the encrypted security information, an authentication program which includes the authentication data and a decryption program corresponding to the encryption, and an installer and uninstaller of the authentication program in package data;

embedding the package data in a background pattern;

converting the non-security information to readable image data; and printing an image constructed by the background pattern and the readable image data on a printing paper, wherein the installer and uninstaller of the authentication program are embedded in a surface of the printing paper as the background pattern.

2. The method according to claim 1, wherein the package data is embedded in a region of the background pattern so as not to overlap with an image of the readable image data.

3. The method according to claim 1, further comprising the step of selecting a method of the embedding based on an arrangement of the readable image data and a characteristic of the package data.

4. A method of extracting data embedded in a document by utilizing an information processing apparatus, the method comprising the steps of:

inputting image data by making a reader read a paper document;

extracting first information which is embedded in the image data and includes an authentication program and an installer of the authentication program;

inputting authentication data;

installing the authentication program on the information processing apparatus using the installer;

executing the authentication program, wherein the authentication data is as input data of the authentication program;

decrypting, if the authentication using the authentication data succeeds, encrypted second information included in the first information by executing a decryption program included in the authentication program; and uninstalling the authentication program from the information processing apparatus after the second information is decrypted, wherein the installer of the authentication program are embedded in a surface of the paper document as a background pattern.

5. The method according to claim 4, further comprising the step of printing the decrypted second information on a printing paper.

6. An information processing apparatus for converting electronic data to image data, comprising:

a first input section, arranged to input electronic data;

a separator, arranged to separate the electronic data into security information and non-security information;

an encoder, arranged to encrypt the security information;

a second input section, arranged to input authentication data;

a packer, arranged to package the encrypted security information, an authentication program which includes the authentication data and a decryption program corresponding to the encryption, and an installer and an uninstaller of the authentication program in a package data;

an embedding section, arranged to embed the package data in a background pattern;

a converter, arranged to convert the non-security information to readable image data; and a printing unit, arranged to print an image constructed by the background pattern and the readable image data on a printing paper, wherein the installer and uninstaller of the authentication program are embedded in a surface of the printing paper as the background pattern.

7. An information processing apparatus for extracting data embedded in a document, comprising:

a first input section, arranged to input image data by making a reader read a paper document;

an extractor, arranged to extract first information which is embedded in the image data and includes an authentication program and an installer of the authentication program;

a second input section, arranged to input authentication data;

an installer, arranged to install the authentication program on the information processing apparatus using the installer;

an authentication section, arranged to execute the authentication program, wherein the authentication data is as input data of the authentication program;

a decryption unit, arranged to decrypt encrypted second information by executing a decryption program included in the authentication program if the authentication using the authentication data succeeds; and an uninstaller, arranged to uninstall the authentication program from the information program after the second information is decrypted, wherein the installer of the authentication program are embedded in a surface of the paper document as a background pattern.

8. A non-transitory storage medium storing a computer-executable program for causing a computer to perform a method of converting electronic data to image data, the method comprising the steps of:

inputting electronic data;

separating the electronic data into security information and non-security information;

encrypting the security information;

inputting authentication data;

packaging the encrypted security information and an authentication program, which includes the authentication data, a decryption program corresponding to the encryption, and an installer and uninstaller of the authentication program in package data;

embedding the package data in a background pattern;

converting the non-security information to readable image data; and printing an image constructed by the background pattern and the readable image data on a printing paper wherein the installer and uninstaller of the authentication program are embedded in a surface of the printing paper as the background pattern.

9. A non-transitory storage medium storing a computer-executable program for causing a computer to perform a method of converting electronic data to image data, the method comprising the steps of:

inputting image data by making a reader read a paper document;

extracting first information which is embedded in the image data and includes an authentication program and an installer of the authentication program;

inputting authentication data;

installing the authentication program on the information processing apparatus using the installer;

executing the authentication program, wherein the authentication data is as input data of the authentication program;

decrypting, if the authentication using the authentication data succeeds, encrypted second information included in the first information by executing a decryption program included in the authentication program; and uninstalling the authentication program from the information processing apparatus after the second information is decrypted, wherein the installer of the authentication program are embedded in a surface of the paper document as a background pattern.

* * * * *